United States Patent [19]
Schoellkopf et al.

[11] 3,818,065
[45] June 18, 1974

[54] PRODUCTION OF AMINOACID PRECURSORS

[75] Inventors: Ulrich Schoellkopf, Bovenden; Fritz Gerhart, Goettingen; Dieter Hoppe, Goettingen; Reinhard Jentsch, Goettingen, all of Germany

[73] Assignee: Badische Anilin- & Soda-Fabrik Aktiengesellschaft, Ludwigshafen/Rhein, Germany

[22] Filed: Dec. 22, 1971

[21] Appl. No.: 211,112

[30] Foreign Application Priority Data
Dec. 23, 1970 Germany............................ 2063502

[52] U.S. Cl.............. 260/464, 260/295 R, 260/309, 260/326.13, 260/332.2 A, 260/345.8, 260/347.4, 260/46.5 D, 260/465.4
[51] Int. Cl.......................................... C07c 121/02
[58] Field of Search.............. 260/465.4, 465 D, 464

[56] References Cited
UNITED STATES PATENTS
3,712,911   1/1973   Schoellkopf et al......... 260/465.4 X OTHER PUBLICATIONS
Migrdichian, Organic Synthesis, Vol. 1, 1957 pp. 733–739, Reinhold Pub. Co.
J. Org. Chem., Vol. 28, No. 6, June 1963 Kay–Fries Chem. Add., p. 1733.

*Primary Examiner*—Joseph P. Brust
*Attorney, Agent, or Firm*—Johnston, Keil, Thompson & Shurtleff

[57] ABSTRACT

The invention relates to the substitution of one or two hydrogen atoms on the α-carbon atom of an α-isocyanocarboxylic acid derivative by means of an alkylating agent and using a metallizing agent.

15 Claims, No Drawings

PRODUCTION OF AMINOACID PRECURSORS

The invention relates to the production of aminoacid precursors by alkylation of α-metallized esters of isocyanocarboxylic acids. They can be converted in a simple way into aminoacids.

Among known methods for the synthesis of aminoacids the present invention is comparable in scope of its application to the method using N-acylamidomalonic esters. This method includes a decarboxylation step which in the case of sensitive substances may result in a substantial decrease in yield (Houben-Weyl, 4th edition, volume XI/2, page 308).

We have now found that isocyanocarboxylic esters are obtained as precursors of aminoacids by reacting an α-metallized isocyanocarboxylic ester of the formula:

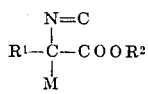
(I)

where
R$^1$ denotes hydrogen or an organic radical attached by way of a carbon atom;
R$^2$ denotes the radical of an alkyl derivative suitable for esterification and
M denotes the radical of lithium, sodium, potassium, magnesium, calcium or thallium with an alkylating agent to form a compound of the formula:

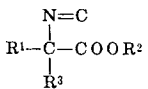
(II)

in which R$^3$ denotes unsubstituted or substituted alkyl or when R$^1$ denotes hydrogen, after its replacement by M, to form a compound of the formula:

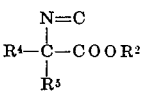
(III)

in which R$^4$ and R$^5$ are like R$^3$ or R$^4$ and R$^5$ together denote a chain of from two to six members.

When R$^4$ and R$^5$ have the meanings given for R$^3$, they may be identical or different.

Alkylating agents are compounds with which the metal radical in a compound of the formula (I) can be replaced by an alkyl or a substituted alkyl radical. Alkylating agents include in particular alkyl halides, alkyl sulfates, alkyl esters of aromatic sulfonic acids and sultones, for example alkyl bromides and iodides, such as methyl, ethyl, propyl, isopropyl, butyl, isobutyl, t-butyl bromides and iodides, allyl bromide, bromohexane, dimethyl sulfate, diethyl sulfate, methyl or ethyl toluenesulfonate and the corresponding phosphoric esters. The alkyl radical may in turn bear substituents such as carboxyl, alkenyl or phenyl radicals and therefore be for example chloroacetic acid, esters of chloroacetic acid and benzyl halides. The alkyl radicals may also be cycloalkyl radicals. Epoxides, for example ethylene oxide, are also suitable alkylating agents for the purposes of the present invention.

Both halogen atoms in a alkyl dihalide for example both bromine atoms in 1,4-dibromobutane, may be replaced by the isocyanocarboxylic ester radical. R$^3$ in formula (II) then bears the said radical twice:

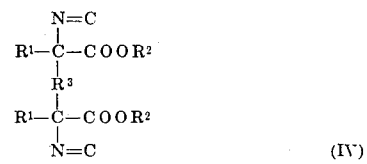
(IV)

When R$^1$ is hydrogen, compounds of formula (III) may also be prepared in which the two bromine atoms are replaced by an isocyanocarboxylic ester radical with ring formation:

(V)

Examples of other dihalogen compounds are: 1,4-dibromobutene, 1-chloro-2-bromoethane, 2,2'-dichlorodiethyl ether, 2,2'-dichlorodiethyl thioether or 1,2-dibromoethane. The alkylating agent may therefore be represented for example by the formula R$^3$X (X denoting the radical of an acid anion), R$^3$X$_2$ (X denoting a halogen atom) or R$^3$X (X denoting a sultone or oxa bridge).

The isocyanocarboxylic esters of formula (I) to be used as starting compounds for this process may be obtained in known manner according to the directions in German Laid-open Print No. 1,812,099.

In these starting compounds R$^1$ may denote for example alkyl such as methyl, ethyl, propyl or butyl; aryl such as phenyl; or cycloalkyl such as cyclohexyl. The alkyl radicals may in turn bear substituents, for example alkoxy or alkylthio radicals. An example of such a radical R$^1$ is the methylthioethyl radical. R$^1$ may also denote a heterocyclic radical as for example indolyl, imidazolyl, furyl, pyridyl or thienyl. R$^2$ may denote for example methyl, ethyl, propyl, butyl, t-butyl or benzyl. Since the radical R$^2$ does not take part in the reaction according to this invention there are no special criteria in its choice. It may be left to the expert to select suitable starting compounds (I) with the many possible radicals R$^2$ and this will not offer any difficulty.

Examples of individual compounds of the formula (I) are metallized ethyl isocyanoacetate, t-butyl α-isocyanoacetate, ethyl α-isocyanopropionate, ethyl α-isocyano-o-α-(2-bromoethyl)-acetate, ethyl α-isocyanobutyrate, ethyl α-isocyanovalerate, ethyl α-isocyanocaproate, ethyl α-isocyanoisobutyrate, ethyl α-isocyanovalerate, ethyl α-isocyano-β-methylvalerate, ethyl α-isocyanophenylacetate (and derivatives thereof substituted in the nucleus), ethyl α-isocyano-β-phenyl propionate, ethyl α-isocyano-β-indolylpropionate, ethyl α-isocyano-β-imidazolyl propionate, ethyl α-isocyano-βarylthiopropionates, ethyl α-isocyano-γ-methylthiobutyrate, ethyl α-isocyano-β-alkoxypropionate, ethyl α-isocyano-β-alkoxybutyrate, diethyl α-isocyanosuccinate, diethyl α-isocyano-glutyrate, and ethyl α-isocyano-γ-bromobutyrate.

Agents supplying M are particularly basic reagents of the type MX where M denotes equivalent of one of the above-mentioned metals and X denotes an aliphatic or aromatic hydrocarbon radical, the radical of an alcohol, the radical of an acetylenic compound or OH. Metallizing agents accordingly include organometallic compounds, alkoxides, acetylides, hydroxides and Grignard compounds. Metallization can also be achieved with metal hydrides or with metal amides and in some cases it is possible to react the isocyanides direct with a metal to form metallized isocyanides.

Examples of individual metallizing agents are butyl lithium, phenyl lithium, phenyl sodium, sodium methylate, sodium ethylate, potassium t-butylate, lithium t-butylate, potassium amide, sodium acetylide, phenyl magnesium bromide, magnesium hydroxide, sodium hydride, sodamide and sodium metal.

It is particularly advantageous in the process of the present invention for the α-metallized isocyanates (I) to be alkylated without isolation, after or during their formation by metallization by a conventional method of the compound (VI)

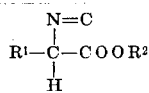
(VI)

(i.e., by bringing this compound together with an agent supplying M). Compounds (VI) may therefore be described also as α-metallizable compounds.

Organic liquids which are conventionally used for alkylation reactions and which for improvement of the yield may be anhydrous are suitable as the reaction medium. Examples are ethers such as diethyl ether, tetrahydrofuran and dioxane; dipolar aprotic solvents such as dimethylformamide, dimethylsulfoxide or acetonitrile or mixtures of two or more of such liquids. Excess starting compound (I) or excess alkylating agent which is liquid at the reaction temperature may also be used as the reaction medium.

The reaction temperature for the alkylation depends on the reactivity of the starting compound and of the alkylating agent. The reaction temperature generally is within the range from about −40° and about 70°C. Temperatures down to −80°C and temperatures above 70°C may also be useful.

In many cases it is advisable to bring the reactants together in stoichiometric proportions, for example when disturbances or difficulties in processing by excess starting compound or excess alkylating agent are to be avoided. Alkylation proceeds even without using an additional base because the anionic radical of the alkylating agent split off is bound by the metal radical. When a starting compound is present in which $R^1$ is hydrogen or a metal radical, the stoichiometric ratio may be provided for by forming a compound of the formula (II) or the formula (III) and in this way even different substituents $R^4$ and $R^5$ may be introduced.

When one component is used in excess which has a boiling point at atmospheric or subatmospheric pressure which lies in the temperature range of the reaction, the other can be dripped or run into the excess reactant and the excess evaporated off.

The invention produces aminoacid precursors which can be converted into aminoacids by hydrolysis. The hydrolysis in dilute acid first results in a N-formyl derivative (—NCHO instead of —NC) and if desired an amine derivative. Hydrolysis in alcoholic caustic alkali solution yields the N-formyl derivative with hydrolysis of the ester group. The methylamine derivative

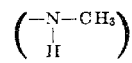

can be prepared from the compounds (II) and (III) by catalytic hydrogenation. When an alkylating agent is used having a radical $R^3$ which bears the radical of an acid anion which is capable of reaction twice ($R^3X_2$) the formation of the compounds of the formula (IV) and compounds of the formula (V) can be directed at will by means of the molar ratio of compound (I) (with $R^1$ denoting hydrogen) and $R^3X_2$. The greater the molar excess of compound (I) over the alkylating agent $R^3X_2$, the greater is the tendency for the formation of compounds having the formula (IV).

When the reaction mixture is very concentrated and the molar ratio of (I) to $R^3X_2$ is chosen at 1:1 or 1:more than 1, compounds of formula (V) are formed preferentially. When compounds (IV) and (V) are formed at the same time neither class of compound offers any difficulty in isolation because of the difference physical behavior. The reaction of the compounds of formula (I) (with $R^1$ denoting hydrogen) with alkylating agents $R^3X_2$ to form compounds of the formula (VII):

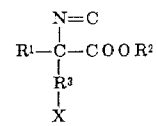
VII also offers no difficulty because for this purpose about 1 mole of metallizing agent, 1 mole of (I) and 1 mole of $R^3X_2$ can be used. The production of oligomers and polymers of isocyanocarboxylic esters is then possible by further metallization.

As compared with prior art methods for the production of aminoacids the process of this invention has a number of advantages: the starting compounds are often more easily accessible, a very great variety of substituents $R^4$ and/or Rhu 5 may be introduced and the α-carbon atom may also bear two substituents; the conversion of the precursors into the aminoacids does not require the step of decarboxylation which is inconvenient for many sensitive substituents.

The following Examples illustrate the invention.

EXAMPLE 1 t-butyl α-isocyanopropionate:

40 ml of t-butyl isocyanoacetate in 10 ml of tetrahydrofuran is dripped with stirring into 42 millimoles of potassium t-butanolate in 50 ml of tetrahydrofuran. The whole is allowed to heat up to 30° to 40°C and 40 millimoles of methyl iodide is dripped in. The whole is stirred until there is a neutral reaction, filtered, the solvent removed in vacuo, 200 ml of ether and 50 ml of ice-water is added and the whole is worked up as usual. 60 percent of the t-butyl ester of α-isocyanopropionic acid having a boiling point of 73° to 75°C at 10 mm is recovered from the ether phase.

EXAMPLE 2

α-isocyanopentene-4-acid t-butyl ester:

The procedure described in Example 1 is followed but allyl bromide is used. 70 percent of the t-butyl ester of α-isocyanopentene-4-acid is obtained having a boiling point of 105° to 110°C at 10 mm.

EXAMPLE 3 t-butyl α-isocyano-β-methylbutyrate:

The procedure described in Example 2 is followed but with isopropyl bromide. The t-butyl ester of α-isocyano-β-methylbutyric acid can be clearly detected in the crude product.

EXAMPLE 4

Ethyl α-isocyano-β-phenylisobutyrate:

40 millimoles of ethyl α-isocyanopropionate and then 42 millimoles of benzyl chloride are dripped while stirring, both at −60°C, into 40 millimoles of potassium t-butanolate in 25 ml of dry tetrahydrofuran. The whole is allowed to warm up to room temperature and is stirred until there is a neutral reaction. The solvent is removed in vacuo. The residue is shaken with 50 ml of ether and 25 ml of ice-water. The phases are separated and worked up as usual. 6.7 g (79 percent) of ethyl α-isocyano-β-phenylisobutyrate is obtained having a boiling point of 100° to 105°C at 0.05 mm.

For conversion into N-formyl-α-methylphenylalanine, 10 millimoles is boiled under reflux in a solution of 1 millimole of potassium hydroxide in 20 ml of 90 percent ethanol for 30 minutes. The solvent is removed in vacuo. The residue is dissolved in 50 ml of water and acidified to pH 2 to 3 with 36 percent hydrochloric acid. The precipitated aminoacid is crystallized, filtered off and recrystallized from a mixture of ethanol and water. 85 percent of N-formyl-α-methylphenylalanine is obtained which is identical with the authentic preparation.

EXAMPLE 5

Ethyl α-isocyano-α-methylcaproate:

The procedure described in Example 4 is followed but with n-butyl iodide. The whole is stirred for 10 minutes, worked up as described in Example 4 and 59 percent of ethyl α-isocyano-α-methylcaproate is obtained having a boiling point of 68° to 69°C at 1.5 mm. By saponification as described in Example 4, 87 percent of α-formylamino-α-methylcaproic acid is obtained.

EXAMPLE 6

Ethyl α-isocyano-α-methylcaprylate:

The procedure described in Example 4 is followed but with 1-bromo-hexane. The whole is stirred for another 30 minutes and worked up as described in Example 4. 62 percent of ethyl α-isocyano-α-methylcaprylate is obtained having a boiling point of 82° to 85°C at 0.8 mm. Upon saponification as described in Example 4, 80 percent of α-formylamino-α-methylcaprylic acid is obtained having a melting point of 145°C (Recrystallized from ethanol:water 1:1).

EXAMPLE 7

Ethyl α-isocyano-α-butylcaproate:

20 millimoles of ethyl isocyanoacetate in 10 ml of tetrahydrofuran is dripped with stirring at −60°C into 40 millimoles of potassium t-butanolate in 25 ml of tetrahydrofuran and then 42 millimoles of butyl iodide is dripped in at −60°C to −50°C. The cooling bath is removed and the whole is stirred at room temperature until at least 95 percent of the alkali used has been used up. The solvent is removed in vacuo. The residue is shaken with 50 ml of ether and 25 ml of ice-water. The phases are separated and worked up as usual. 2.2 g (50 percent) of ethyl α-isocyano-α-butylcaproate is obtained with a boiling point of 80° to 82°C at 0.1 mm.

EXAMPLE 8

Ethyl α-isocyano-β, β-diphenylisobutyrate:

The procedure described in Example 7 is followed but with benzyl bromide. The whole is stirred for ten minutes at room temperature and worked up as described in Example 7. 3.7 g (64 percent) of ethyl α-isocyano-β,β-diphenylisobutyrate is obtained having a boiling point of 150° to 153°C at 0.05 mm.

EXAMPLE 9

A suspension of 40 millimoles of the ethyl ester of potassium isocyanoacetic acid (prepared from ethyl isocyanoacetate and potassium t-butanolate at −60°C) in 40 ml of tetrahydrofuran is dripped at 20°C while stirring into a solution of 50 millimoles of benzyl bromide in tetrahydrofuran. Conventional working up gives a mixture of ethyl 1-isocyano-2-phenylpropionate and ethyl α-isocyano-β, β-diphenylisobutyrate.

EXAMPLE 10

Ethyl α-isocyanocyclopropanoate:

40 millimoles of sodium hydride (suspended in 30 ml of ether) is dripped at 20° to 25°C with vigorous stirring into 40 millimoles of ethyl isocyanoacetate and 40 millimoles of 1,2-dibromoethane in a mixture of 40 ml of dry dimethylsulfoxide and 100 ml of dry ether (under nitrogen). The whole is further stirred without cooling until evolution of gas has ceased. The whole is then boiled for thirty minutes. The reaction mixture is poured into 100 ml of ice-water, the organic phase is separated, extracted twice, each time with 50 ml of ether and the organic phase is washed twice with 30 ml of water. The product is dried over sodium sulfate, the solvent is distilled off over a 25 cm column and distilled in vacuo. 3.2 g (58 percent) of ethyl α-isocyanocyclopropanoate is obtained having a boiling point of 91° to 95°C at 20 mm.

EXAMPLE 11

Diethyl α-isocyano-α-methylsuccinate:

0.05 mole of ethyl isocyanopropionate is dripped at −5°C while stirring into a suspension of 0.05 mole of potassium t-butanolate in 50 ml tetrahydrofuran. The whole is cooled to −70°C and 0.05 mole of ethyl chloroacetate is dripped in. This mixture is added from a dropping funnel cooled with methanol and solid carbon dioxide in 50 ml of tetrahydrofuran preheated to 50°C while stirring. The whole is heated for about 30 minutes, the solvent is distilled off in vacuo, the residue is shaken with 20 ml of ice-water and 20 ml of ether and the ethereal phase is worked up as usual. 31 percent of diethyl α-isocyano-α-methylsuccinate is obtained; it has a boiling point of 72° to 74°C at 0.1 mm.

EXAMPLE 12 t-butyl α-isocyanocyclopentanoate:

0.05 mole of ethyl isocyanoacetate is dripped at −5°C while stirring into 0.1 mole of potassium t-butanolate in 50 ml of dry tetrahydrofuran. The whole is cooled to −70°C and 0.05 mole of 1,4-dibromobutane is dripped in. This mixture is then added from a dropping funnel (cooled with a mixture of methanol and solid carbon dioxide) to 50 ml of tetrahydrofuran (which has been preheated to 50°C) while stirring. The whole is heated for about thirty minutes, the solvent is distilled off in vacuo, 20 ml of ice-water and 200 ml of ether are added to the residue and the ethereal phase is worked up as usual. 68 percent of t-butyl α-isocyanocyclopentanoate is obtained having a boiling point of 52°C at 0.2 mm.

EXAMPLE 13

Ethyl 1-isocyano-2-(2'-methylmercaptoethyl)-4-methylpentanoate:

A solution of 7.5 g (0.04 mole) of ethyl α-isocyano-γ-methylmercaptobutyrate in 20 ml of tetrahydrofuran is dripped at −60°C into 4.5 g (0.04 mole) of potassium t-butanolate in 25 ml of tetrahydrofuran, then 10.0 g (0.042 mole) of isobutyl P-toluenesulfonate is added, the whole is allowed to warm up to 20°C and is stirred for another 3 hours at this temperature. The conventional working up gives 5.2 kg (40 percent) of ethyl 1-isocyano-2-(2'-methyl-mercaptoethyl)-4-methylpentanoate having a boiling point of 110° to 112°C at 0.1 mm.

EXAMPLE 14

Ethyl 1-isocyano-2-(2'-methylmercaptoethyl)-4-methylpentanoate:

A suspension of 1.1 g (0.045 mole) of sodium hydride in 20 ml of ether is dripped at 20°C into 7.5 g (0.04 mole) of ethyl α-isocyano-γ-methylmercaptobutyrate and 10.0 g (0.042 mole) of isobutyl p-toluenesulfonate in 20 ml of dimethylsulfoxide. The whole is stirred for another hour at 30°C. Conventional working up gives 6.5 g (70 percent) of ethyl 1-isocyano-2-(2'-methylmercaptoethyl)-4-methyl-pentanoate having a boiling point of 110° to 112°C.

EXAMPLE 15

Ethyl 4-isocyanotetrahydropyran-4-carboxylate:

2.2 g (0.09 mole) of sodium hydride in 40 ml of ether is dripped at 20°C into 4.52 g (0.04 mole) of ethyl isocyanoacetate and 5.8 g (0.042 mole) of 2,2'-dichlorodiethyl ether in a mixture of 40 ml of dimethylsulfoxide and 100 ml of ether. The whole is stirred for another hour at 30°C and then worked up as usual. 1.59 g (20 percent) of ethyl 4-isocyanotetrahydropyran-4-carboxylate is obtained having a boiling point at 3 mm of 105° to 110°C.

EXAMPLE 16

Ethyl α-isocyano-β-phenylisobutyrate:

1.1 g (0.045 mole) of sodium hydride in 20 ml of ether is dripped at 20°C into 5.2 g (0.04 mole) of ethyl α-isocyanopropionate and 7.1 g (0.042 mole) of benzyl bromide in 20 ml of dimethylsulfoxide and 50 ml of ether. The whole is stirred for 1 hour at 30°C and worked up as usual. 7.0 g (80 percent) of ethyl α-isocyano-β-phenylisobutyrate is obtained having a boiling point of 106° to 108°C at 0.2 mm.

We claim:

1. A process for production of a compound of the formula

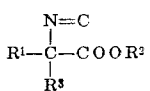

where $R^1$ denotes hydrogen an alkyl group, an alkoxyalkyl group, an alkylthioalkyl group, a cycloalkyl group or a phenyl group, $R^2$ denotes alkyl or benzyl and $R^3$ denotes the alkylating moiety of an alkylating agent defined infra, which comprises reacting an α-metallized isocyanocarboxylic acid ester of the formula:

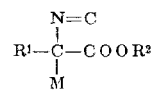

where $R^1$ and $R^2$ are as defined above, and M denotes the radical of lithium, sodium, potassium, magnesium, calcium or thallium with an alkylating agent selected from the group consisting of an alkyl monohalide, an allyl monohalide, an alkyl sulfate, an alkyl ester of an aromatic sulfonic acid, an alkyl sultone, an alkyl phosphoric ester, a benzyl halide, and ethylene oxide to form a compound of the first formula given above.

2. A process for production of a compound of the formula

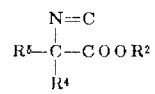

wherein $R^4$ and $R^5$ denote the alkylating moiety of an alkylating agent defined infra, which comprises reacting an α-metallized isocyanocarboxylic acid ester of the formula

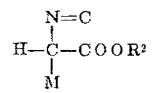

wherein $R^2$ denotes alkyl or benzyl and M denotes the radical of lithium, sodium, potassium, magnesium, calcium or thallium with 2 mols of an alkylating agent selected from the group consisting of an alkyl monohalide, an allyl monohalide, an alkyl sulfate, an alkyl ester of an aromatic sulfonic acid, an alkyl sultone, an alkyl phosphoric ester, a benzyl halide, and ethylene oxide to form a compound of the first formula given above.

3. A process for production of a compound of the formula

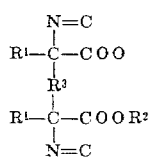

where $R^1$ denotes hydrogen an alkyl group, an alkoxyalkyl group, an alkylthioalkyl group, a cycloalkyl group or a phenyl group, $R^2$ denotes alkyl or benzyl and $R^3$ denotes an alkylene group, which comprises reacting an α-metallized isocyanocarboxylic acid ester of the formula:

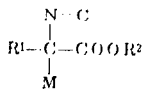

where $R^1$ and $R^2$ denote the groups defined above with an alkyl dihalide having $R^3$ as its alkyl group.

4. A process as claimed in claim 1 wherein the α-metallized isocyanocarboxylic ester is formed by bringing together a metallizing agent of the metal M and a compound of the formula

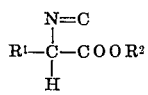

wherein $R^1$ and $R^2$ have the meanings given above, and the reaction with the alkylating agent is carried out in the same reaction mixture.

5. A process as claimed in claim 2 wherein the α-metallized isocyanocarboxylic ester is formed by bringing together a metallizing agent of the metal M and a compound of the formula

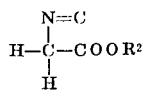

wherein $R^2$ has the meaning given above, and the reaction with the alkylating agent is carried out in the same reaction mixture.

6. A process as claimed in claim 3 wherein the α-metallized isocyanocarboxylic ester is formed by bringing together a metallizing agent of the metal M and a compound of the formula

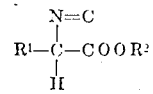

wherein $R^1$ and $R^2$ have the meanings given above, and the reaction with the alkylating agent is carried out in the same reaction mixture.

7. A process as claimed in claim 1 carried out with the molar ratio of isocyanocarboxylic ester to alkylating agent about 1:1.

8. A process as claimed in claim 2 carried out with the molar ratio of isocyanocarboxylic ester to alkylating agent about 1:2 at −40°C to +70°C.

9. A process as claimed in claim 3 carried out with the molar ratio of isocyanocarboxylic ester to alkyl dihalide about 2:1.

10. A process as claimed in claim 1 wherein $R^1$ denotes alkyl having one to four carbon atoms.

11. A process as claimed in claim 3 wherein $R^1$ denotes alkyl having one to four carbon atoms.

12. A process as claimed in claim 2 wherein M in said formula of said ester is first replaced by the radical $R^4$ by alkylation with one of said alkylating agents and the hydrogen atom on the metallized carbon is replaced by the radical $R^5$ by further alkylation with one of said alkylating agents via the intermediary radical M.

13. A process as claimed in claim 1 wherein $R_1$ denotes alkyl with one to four carbon atoms, phenyl, cyclohexyl, alkoxyalkyl, alkylthioalkyl, and $R^2$ denotes alkyl of one to four carbon atoms or benzyl.

14. A process as claimed in claim 3 wherein $R^1$ denotes alkyl with one to four carbon atoms, phenyl, cyclohexyl, alkoxyalkyl, alkylthioalkyl, and $R^2$ denotes alkyl of one to four carbon atoms or benzyl.

15. A process as claimed in claim 2 wherein $R^2$ denotes alkyl of one to four carbon atoms or benzyl.

* * * * *

UNITED STATES PATENT OFFICE
CERTIFICATE OF CORRECTION

Patent No. 3,818,065      Dated June 18, 1974

Inventor(s) Ulrich Schoellkopf et al

It is certified that error appears in the above-identified patent and that said Letters Patent are hereby corrected as shown below:

Column 4, line 43, "Rhu 5" should read --$R^5$--.

Column 8, line 55, in the formula, "COO" should read --$COOR^2$--.

Signed and sealed this 7th day of January 1975.

(SEAL)
Attest:

McCOY M. GIBSON JR.          C. MARSHALL DANN
Attesting Officer             Commissioner of Patents